United States Patent [19]

Houle

[11] 4,060,398
[45] Nov. 29, 1977

[54] ABSORPTION PROCESS

[75] Inventor: Joseph Francois Houle, Oxford, Mass.

[73] Assignee: Leah Mary Louise Houle, Oxford, Mass. ; a part interest

[21] Appl. No.: 715,285

[22] Filed: Aug. 18, 1976

[51] Int. Cl.² ............................................. B01D 47/00
[52] U.S. Cl. ........................................... 55/73; 55/95; 55/256; 55/DIG. 30; 423/242
[58] Field of Search ............. 55/73, 95, 256, DIG. 30; 423/242, 522, 531, 55

[56] References Cited

U.S. PATENT DOCUMENTS

| 816,918 | 4/1906 | Knietsch | 423/522 |
|---|---|---|---|
| 2,522,475 | 9/1950 | Walker | 55/256 |
| 2,720,280 | 10/1955 | Doyle | 55/73 |

Primary Examiner—Bernard Nozick

Attorney, Agent, or Firm—Ross, Ross & Flavin

[57] ABSTRACT

Absorption process comprising supplying impure sulfur-containing exhaust gases into a gas supply which conduit defines a vertically-upward path followed by a vertically-downward path. The end of the vertically-downward path leading to a branch has an outlet opening communicating with a water-cooled bath, through which bath containing sulfuric acid a conduit for the continued passage of the exhaust gases extends in an end-to-end manner, the conduit at its inboard end defining an inlet opening disposed above the level of the sulfuric acid in the bath and the conduit at its outboard end turning upon itself to define an outlet opening disposed below the level of the sulfuric acid in the bath while the outboard end of the bath communicates with a gas outlet conduit venting the cleansed air to atmosphere by a vacuum pump.

1 Claim, 1 Drawing Figure

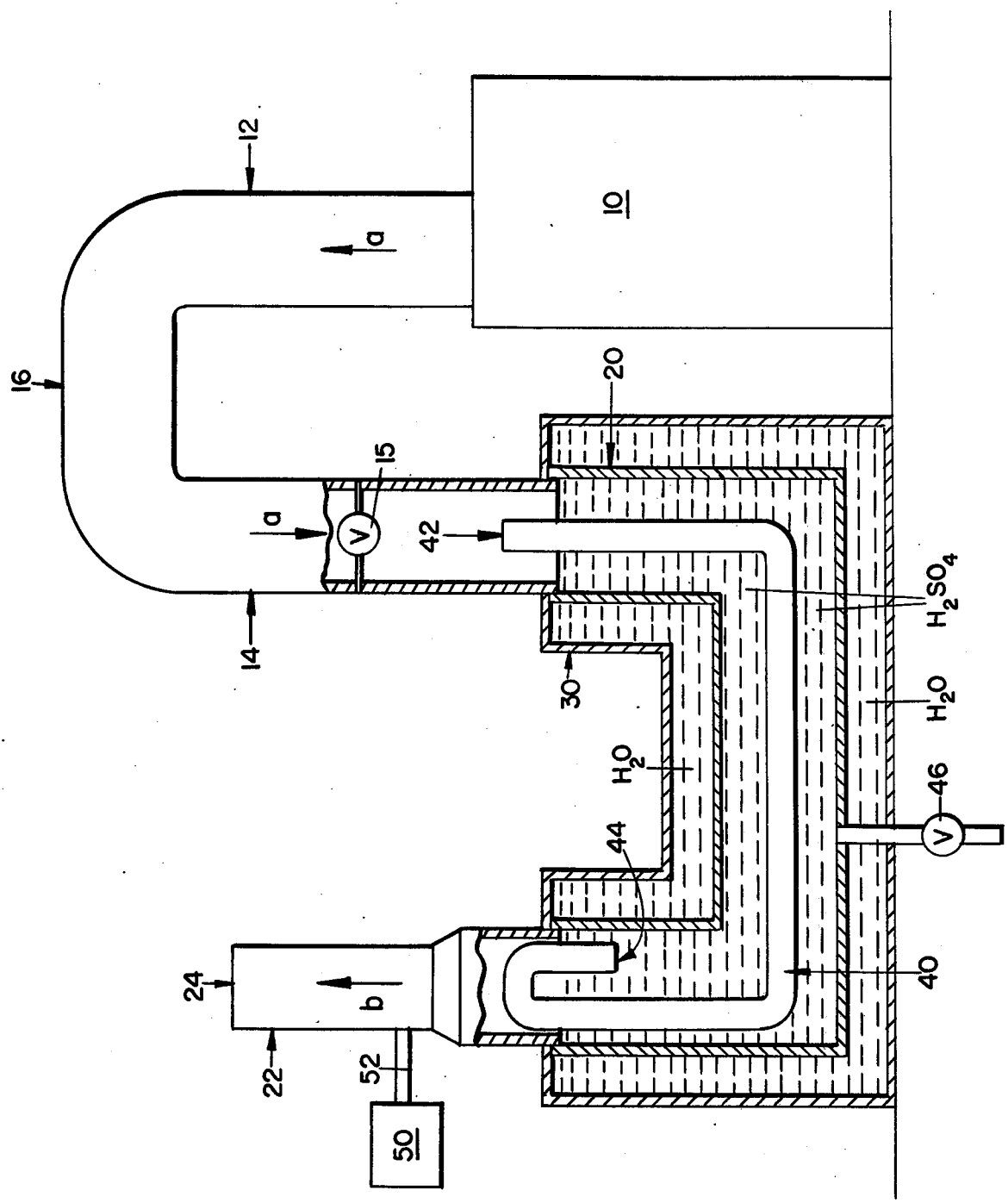

ABSORPTION PROCESS

The present process is directed to a method of treating the effluent gas stream emanating through an exhaust stack pipe connected to a furnace, boiler, stove, vehicle or the like, which fumes may have a content of sulfur dioxide, sulfur trioxide and other like sulfurs and/or carbon monoxide, carbon dioxide, and other carbons. The treatment steps include the cooling of a bath of an absorber to below 100° F, which absorber consists of aqueous sulfuric acid or other acid compatible with the gases desired to be extracted from the exhaust fumes, and through which bath the effluent gas stream is drawn as by a vacuum means to the end that the sulfur or carbon portions of the gas phase are absorbed by the acid preliminary to the release of the cleansed air to atmosphere.

Stated otherwise, the process is for purifying gaseous effluents which contain impurities, more especially oxides of sulphur and carbon and comprehends the passage of the impure effluent through a carrier fluid before discharge to atmosphere, with the harmful constituents of the gas being removed by the absorptive capacity of the carrier fluid.

The harmful and polluting properties of the oxides of sulphur or carbon dictate the purification of gaseous effluents containing such gases before they are passed to atmosphere. Such gaseous effluents are produced in heated spaces, oxides of sulphur or carbon being produced by the oxidation of sulphur or carbon present in fuels used for combustion purposes, and it is considered economically desired to recover these gases in the form of an acid, particularly sulphuric acid.

By the invention hereof, it is particularly possible to obtain a high rate of elimination of the sulphur oxides present in gaseous effluents, particularly industrial effluents, at low cost and exceptional speed.

For a better understanding of the invention and to show how it can be carried into effect, reference will now be made, by way of illustration only, to the accompanying drawing which is a flow line of an installation embodiment which can be used for carrying out the process of the invention.

Fumes of industrial effluent, such as for example, from a coal burning power plant or an internal combustion engine 10 are introduced to the system via a vertically-upwardly extending portion 12 of a stack connecting thereto, the fumes flowing in the direction of arrow a. A vertically-downwardly portion 14 of the stack communicates therewith via a tangential portion 16 distantly of the power plant.

Such portion 14 may be suitably branched so as to provide a branch each leading to a cleansing unit with each unit being suitably valved as at 15 so as to be in seriatim opened and closed all whereby one unit may be rendered operative while all other units are rendered inoperative.

One such cleansing unit is shown and is now described.

The lower extremity of stack portion 14 communicates directly with the inboard end of a U-shaped bath 20, the opposite outboard end of the bath communicating directly with a vertically-extending outlet conduit 22 which has an open upper end 24 leading to atmosphere, with the cleansed gases passing therethrough in the direction of arrow b and outwardly therefrom to atmosphere.

Bath 20 is circumscribed on all sides of its exterior surface by a cooling jacket 30.

Bath 20 supports a charge of sulphuric acid, designated $H_2SO_4$, and cooling jacket 30 supports a charge of water, designated $H_2O$. Recirculating means (not shown) may be provided for facilitating the recirculation of either fluid.

A conduit 40 of generally U-shaped configuration is disposed centrally of and through the bath and is of such dimension as to provide an inboard opening 42 disposed upwardly of the $H_2SO_4$ within the bath and an outboard opening 44 which is defined by a leg of the conduit which is turned upon itself so as to terminate at a point downwardly of and below the level of the $H_2SO_4$ within the bath.

The structure is designed as to ensure intimate mixing of the sulfurous fumes within the stack with the $H_2SO_4$ in the bath by being drawn into and through and outwardly of conduit 40.

The acid, whose concentration will have increased by such additive, may be drawn off through a valved recirculating means 46, the level of the acid in the bath being thus regulatable as a function of the desired acid concentration, with the acid being drawn off as desired for purposes of subjecting same to a decantation step (not shown).

Additionally, the cleansed gases may be drawn from the bath by means of a vacuum pump 50 which will communicate with outlet conduit 22.

Additionally, and if desired, before the fumes leave the bath as cleansed gases, they can be passed through a filter means (not shown) within outlet conduit 22.

I claim:

1. An absorption process for purifying sulfur-containing exhaust gases emanating from a smoke-generating facility comprising the steps:

conducting the exhaust gases from the facility through a connecting gas inlet conduit to a water-cooled sulfuric acid bath communicating with the conduit, directing the gases through the length of the bath via a bath conduit having an upstream entrance terminal disposed in the gas supply conduit and above the acid level in the bath and having a downstream discharge terminal reversed upon itself interiorly of the bath for the direct charge of the gases into the acid below the acid level in the bath, and drawing by means of a vacuum pump the cleansed exhaust gases outwardly of the acid in the bath through a connecting gas outlet conduit for the venting of the cleansed gases therefrom to atmosphere.

* * * * *